(12) United States Patent
Ahluwalia

(10) Patent No.: US 10,271,205 B1
(45) Date of Patent: Apr. 23, 2019

(54) METHODS AND DEVICES FOR RESOLVING CONFLICTS BETWEEN IDENTIFIERS FOR COMMUNICATION DEVICES

(71) Applicant: AT&T Intellectual Property I, L.P., Atlanta, GA (US)

(72) Inventor: Inderpreet Singh Ahluwalia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/828,614

(22) Filed: Dec. 1, 2017

(51) Int. Cl.
| | |
|---|---|
| H04W 8/26 | (2009.01) |
| H04W 48/08 | (2009.01) |
| H04W 8/18 | (2009.01) |
| H04W 12/08 | (2009.01) |
| H04W 76/11 | (2018.01) |
| H04W 24/04 | (2009.01) |
| H04W 84/04 | (2009.01) |

(52) U.S. Cl.
CPC .............. *H04W 8/26* (2013.01); *H04W 8/18* (2013.01); *H04W 12/08* (2013.01); *H04W 48/08* (2013.01); *H04W 76/11* (2018.02); H04W 24/04 (2013.01); H04W 84/045 (2013.01)

(58) Field of Classification Search
CPC ......... H04W 8/26; H04W 8/18; H04W 76/11; H04W 12/08; H04W 48/08; H04W 76/021; H04W 84/045; H04W 24/04
See application file for complete search history.

(56) References Cited

U.S. PATENT DOCUMENTS

| | | | |
|---|---|---|---|
| 5,333,185 | A | 7/1994 | Burke et al. |
| 6,039,624 | A | 3/2000 | Holmes |
| 6,118,775 | A | 9/2000 | Kari et al. |
| 6,983,159 | B2 | 1/2006 | Di Pasquale et al. |
| 7,464,872 | B2 | 12/2008 | Doerwald et al. |

(Continued)

FOREIGN PATENT DOCUMENTS

| | | |
|---|---|---|
| WO | 2016145815 A1 | 9/2016 |
| WO | 2017172436 | 10/2017 |

OTHER PUBLICATIONS

"Cdma2000 M2M Numbering Recommendations System Requirements.Document", 3rd Generation Partnership Project 2, 3GPP2, Sc.R4005-0,.Version 1.0, 14, Oct. 14, 2011, 1-37.

(Continued)

*Primary Examiner* — Marcos L Torres
(74) *Attorney, Agent, or Firm* — Guntin & Gust, PLC; Atanu Das

(57) ABSTRACT

Aspects of the subject disclosure may include, for example, identifying an international mobile subscriber identity (IMSI) for a first mobile device, wherein the IMSI comprises fifteen digits. Further embodiments can include generating a first integrated circuit card identifier (ICCID). In addition, embodiments can include determining a match between the first ICCID and a second ICCID for a second mobile device and adjusting the first ICCID responsive to determining the match. Also, the embodiments can include transmitting the adjusted first ICCID. Transmitting the adjusted first ICCID facilitates a SIM manufacturer to provision a SIM with the first ICCID to a first mobile device to provide communication services. Other embodiments are described in the subject disclosure.

20 Claims, 9 Drawing Sheets

(56) References Cited

U.S. PATENT DOCUMENTS

| | | | |
|---|---|---|---|
| 7,590,678 | B2 | 9/2009 | Jääskelä et al. |
| 8,694,002 | B1 | 4/2014 | Narendran et al. |
| 8,706,101 | B2 | 4/2014 | Bouckaert et al. |
| 8,923,917 | B2 | 12/2014 | Feng |
| 8,965,362 | B1 | 2/2015 | Muthuswamy et al. |
| 9,094,829 | B2 | 7/2015 | Chen et al. |
| 9,380,454 | B2 | 6/2016 | Kukuchka et al. |
| 9,398,445 | B2 | 7/2016 | Folk et al. |
| 9,699,642 | B2 | 7/2017 | Li et al. |
| 2013/0091093 | A1* | 4/2013 | Wang ................ G06F 17/30286 707/609 |
| 2015/0319133 | A1* | 11/2015 | Seo .................... H04L 61/1588 709/223 |
| 2017/0118625 | A1* | 4/2017 | Miao ....................... H04W 8/18 |

OTHER PUBLICATIONS

"Here are the Original Sprint IMSIs from SPRINT Sims", GSM Forum, forum.gsmhosting.com, poster: ashish_beri,, Oct. 22, 2013, pp. 1-4.

Taleb, Tarik, "Follow Me Cloud: Interworking Federated Clouds and Distributed Mobile Networks", IEEE Network 27.5, Sep. 2013, 12-19.

\* cited by examiner

101

103

200

400

METHODS AND DEVICES FOR RESOLVING CONFLICTS BETWEEN IDENTIFIERS FOR COMMUNICATION DEVICES

FIELD OF THE DISCLOSURE

The subject disclosure relates to a methods and devices for resolving conflicts between identifiers for communication devices.

BACKGROUND

A communication device such as a mobile device is configured with an international mobile subscriber identity (IMSI) that can be used for communication network registration. Further, the communication device can provisioned with an integrated circuit card identifier (ICCID) that is used to identify a subscriber identity module (SIM) for the communication device. In some cases The ICCID can be derived in part from the IMSI and in other instances the two are unrelated. However, there can be some instances the ICCID for two communication devices can be the same when each of the two communication devices have similar IMSIs.

BRIEF DESCRIPTION OF THE DRAWINGS

Reference will now be made to the accompanying drawings, which are not necessarily drawn to scale, and wherein.

DETAILED DESCRIPTION

Figure 1A:
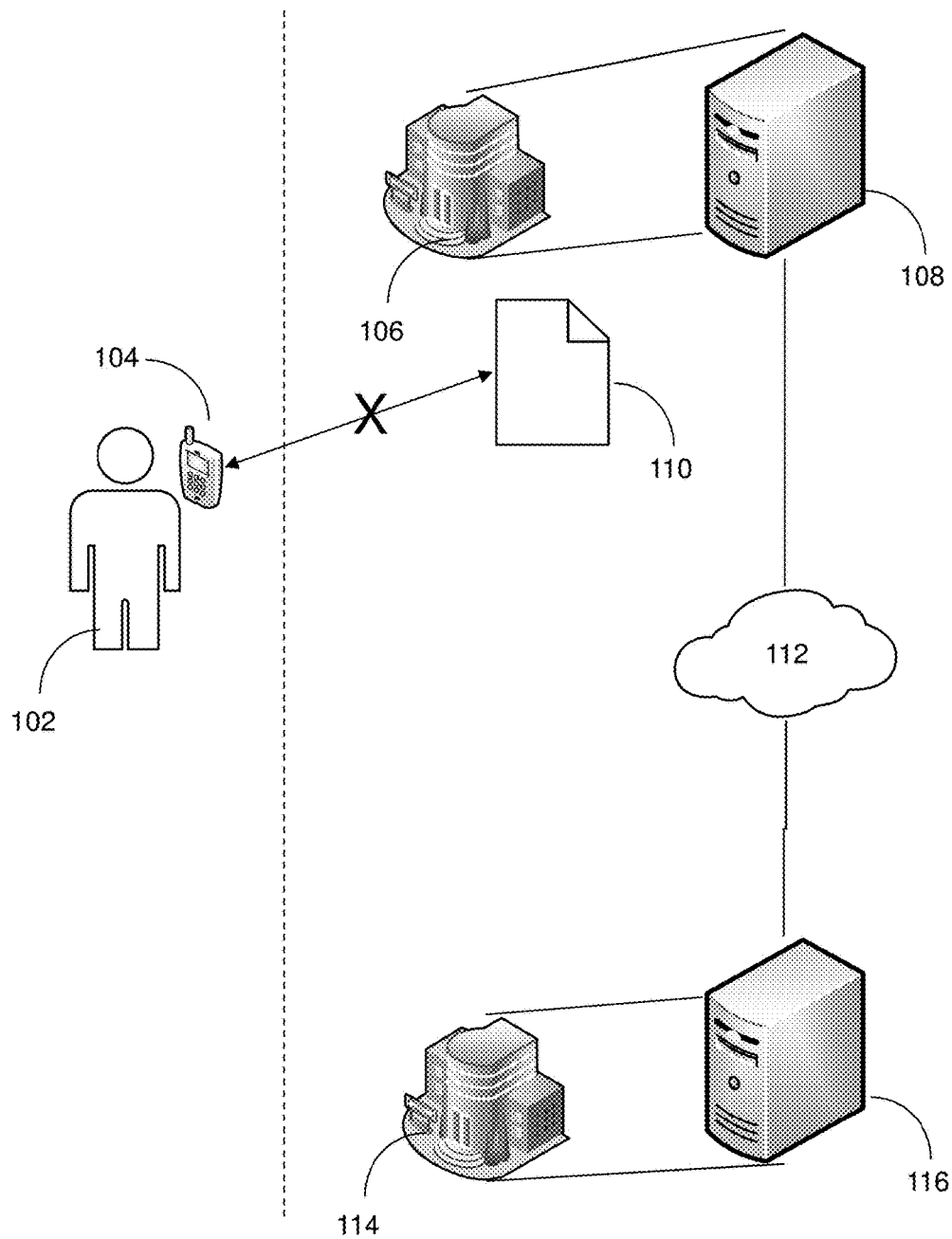
FIGS. 1A-C and FIG. 2 depict illustrative embodiments of systems for resolving conflicts between identifiers for communication devices.

The subject disclosure describes, among other things, illustrative embodiments for resolving conflicts between identifiers for communication devices. Embodiments can include identifying an international mobile subscriber identity (IMSI) for a first mobile device, wherein the IMSI comprises fifteen digits. A first three digits of the IMSI comprises a mobile country code (MCC). A second three digits of the IMSI comprises a mobile network code (MNC). Further embodiments can include generating a first integrated circuit card identifier (ICCID). The ICCID is comprised of several components (as specified in the standard ITU E.118 incorporated herein by reference) and can be nineteen (or twenty in some cases) digits, a first two digits of the ICCID comprises a major industry identifier (MII), wherein a second two digits comprises a country code (CC), and a first three digits of the ICCID after the CC comprises the MNC. In addition, embodiments can include determining a match between the first ICCID and a second ICCID for a second mobile device and adjusting the first ICCID resulting in a first adjusted ICCID responsive to determining the match. Also, the embodiments can include transmitting the adjusted first ICCID, wherein the adjusted first ICCID is associated with the IMSI for the first mobile device. Transmitting the adjusted first ICCID facilitates a SIM manufacturer to provision a SIM with the first ICCID to a first mobile device to provide communication services. Other embodiments are described in the subject disclosure.

One or more aspects of the subject disclosure include a device. Further the device can include a processing system including a processor and a memory that stores executable instructions that, when executed by the processing system, facilitate performance of operations. The operations can include identifying an international mobile subscriber identity (IMSI) for a first mobile device. The IMSI comprises fifteen digits such that a first three digits of the IMSI comprises a mobile country code (MCC) and a second three digits of the IMSI comprises a mobile network code (MNC). Further, the operations can include generating a first integrated circuit card identifier (ICCID). The ICCID comprises twenty digits such that a first two digits of the ICCID comprises a major industry identifier (MII), a second two digits comprises a country code (CC), and a first three digits of the ICCID after the CC comprises the MNC. In addition, the operations can include determining a match between the first ICCID and a second ICCID for a second mobile device (In some embodiments, the ICCID can be comprised of 19 digits. In other embodiments, twenty digits can be used. Some carriers prefer using twenty digits because it occupies 10 bytes in the SIM card). Also, the operations can include adjusting the first ICCID resulting in a first adjusted ICCID responsive to determining the match and transmitting the adjusted first ICCID, wherein the adjusted first ICCID is associated with the IMSI for the first mobile device. Transmitting the adjusted first ICCID facilitates a SIM manufacturer to provision a SIM with the first ICCID to a first mobile device to provide communication services.

One or more aspects of the subject disclosure include a machine-readable storage medium, comprising executable instructions that, when executed by a processing system including a processor, facilitate performance of operations. The operations can include identifying an IMSI for a first mobile device. The IMSI comprises fifteen digits such that a first three digits of the IMSI comprises a MCC, and a second three digits of the IMSI comprises a MNC. Further, the operations can include generating a first ICCID. The ICCID comprises twenty digits such that a first two digits of the ICCID comprises a MII, a second two digits comprises a CC, and a first three digits after the CC of the first ICCID comprises the MNC. In addition, the operations can include receiving a network error indicating that the first ICCID is same as a second ICCID for a second mobile device. Also, the operations can include adjusting the first ICCID resulting in a first adjusted ICCID such that the adjusting of the first ICCID comprises adjusting a number of digits for the CC of the first ICCID. Further, the operations can include transmitting the adjusted first ICCID. The adjusted first ICCID is associated with the IMSI for the first mobile device.

One or more aspects of the subject disclosure include a method. The method can include identifying, by a processing system including a processor, an IMSI for a first mobile device. The IMSI comprises fifteen digits such that a first three digits of the IMSI comprises a MCC, and a second three digits of the IMSI comprises a MNC. Further, the method can include generating, by the processing system, a first ICCID. The ICCID comprises twenty digits such that a first two digits of the ICCID comprises a MII, a second two digits comprises a CC, and a first three digits after the CC of the first ICCID comprises the MNC. In addition, the method can include determining, by the processing system, a match between the first ICCID and a second ICCID for a second mobile device. Also, the method can include adjusting, by the processing system, the first ICCID resulting in a first adjusted ICCID responsive to determining the match. The adjusting of the first ICCID comprising adjusting a fourth digit of the first ICCID.

FIGS. 1A-C and FIG. 2 depict illustrative embodiments of systems for resolving conflicts between identifiers for communication devices. Referring to FIG. 1A, in one or more embodiments, a system 100 can include a communication device 104 associated with a user 102. The communication device 104 can be a mobile device such as a mobile phone, tablet computer, laptop computer, sensor, Internet of Things (IoT) device, wearable device, or any communication device provisioned with a SIM. The communication device 104 can be provisioned with an IMSI as well as an ICCID derived, in part, from the IMSI. In some embodiments, the ICCID is not used in any signaling over the air interface, only the IMSI is used. The ICCID is used to identify the physical SIM card and is used in IT systems. Further, a mobile network operator 106 can generate a new ICCID for a new communication device with a different IMSI than the IMSI for the communication device 104. That is, the mobile network operator 106 can generate the new ICCID according to part of the IMSI and can access a document 110 of a database from a server 108 to manage the ICCID for a newly provisioned SIM to be installed by a SIM provider 114. After an ICCID is generated, it can be provided to a server 116 operated by the SIM provider 114 over a communication network 112.

In one or more embodiments, a mobile network operator 106 can detect that a newly generated ICCID for a newly provisioned SIM matches, is the same as, or conflicts with the communication device 104 already in use by the mobile network. If a new communication device is provisioned with such a newly generated ICCID and is registered for use in the same mobile network as communication device 104 then there may be a registration error, data routing error, or some other network error associated with the new communication device. For example, registration for the new communication device may be denied because a network registration device detects that communication device 104 has a matching ICCID to the new communication device and determines that data destined for communication device 104 can be incorrectly routed to the new communication device. In another example, the new communication device can be registered but data destined to communication device 104 can be incorrectly routed to the new communication device. In a further example, a network registration device detects the communication device 104 and the new communication device have the same ICCID and simply provides a notification to the new communication device of a network error. Any of these errors causes inconvenience to a user associated with the new communication device as well as mobile network operator personnel who have to resolve such an ICCID conflict.

In one or more embodiments, in response to detecting that a newly generated ICCID matches, is the same as, or conflicts with the ICCID associated with the communication device 104, the server 108 can adjust the newly generated ICCID resulting in an adjusted ICCID that is different than the ICCID associated with the communication device 104. The adjusted ICCID can be provided to the server 116 associated with a SIM provider 114 over a communication network 112. The SIM provider can access the adjusted ICCID from the server 116 to provision a SIM for a new communication device, thereby avoiding any ICCID conflict with communication device 104.

Figure 1B:
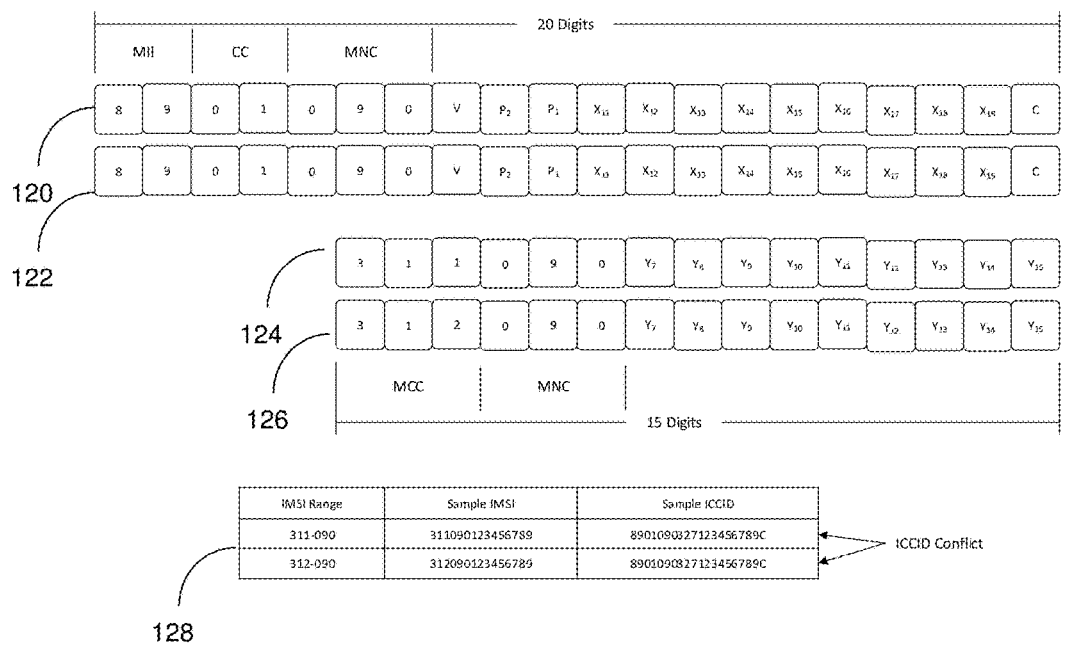

Referring to FIG. 1B, in one or more embodiments, a first IMSI 124 for a first communication device and a second IMSI 126 for a second communication device are shown. The first three digits of an IMSI 124-126 comprise the MCC and the next three digits comprise the MNC. The last nine digits can be a unique identification number. Further, FIG. 1B shows a first ICCID 120 for the first communication device and a second ICCID 122 for the second communication device. The first ICCID 120 is associated with the first IMSI 124 and the second ICCID 122 is associated with the second IMSI 126. The first three digits of an ICCID 120-122 comprise the MII, the next two digits comprise the CC, and the next three digits comprise the MNC of the associated IMSI. Further, the eighth digit is the vendor number, and the next two digits are the card type. In addition, the next nine digits can be a unique identification number that can be the last nine digits of the associated IMSI. Further, the last digit of the ICCID 120-122 can be a check digit. As can be seen in chart 128, the first IMSI can different from the second IMSI by one digit because they each have a different MCC. Thus, using such a scheme shown in FIG. 1B to generate an ICCID, the first ICCID 120 can match, be the same as, or conflict with the second ICCID 122.

Figure 1C:
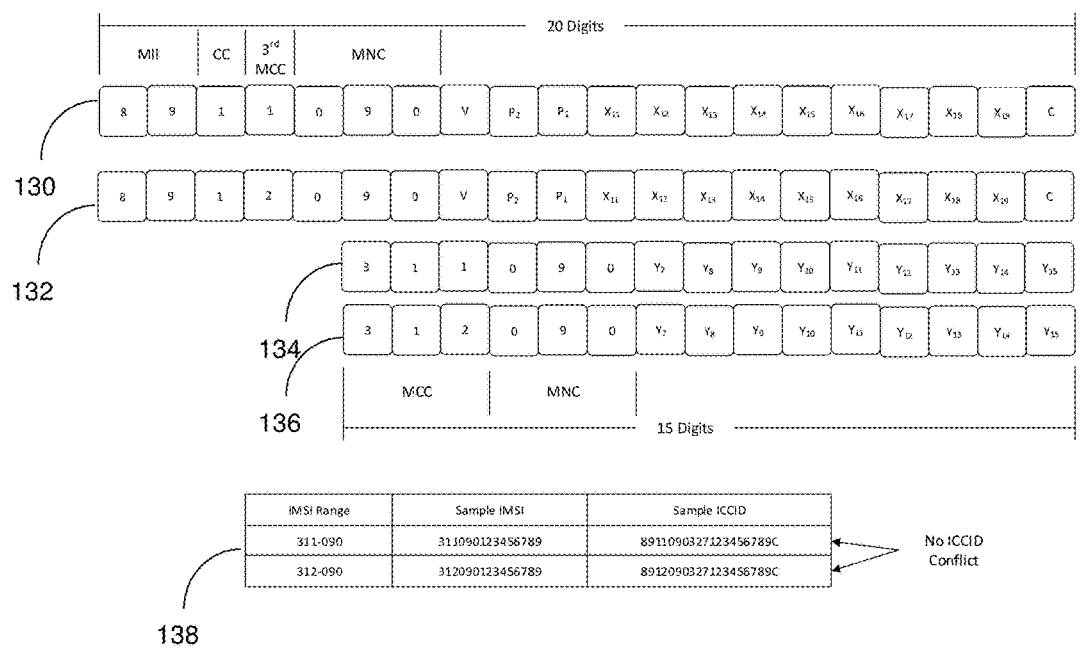

Referring to FIG. 1C, in one or more embodiments, a first ICCID 130 and a second ICCID 132 can each be generated or adjusted to have different ICCIDs when having the same first IMSI 134 and the same second IMSI 136 as shown in FIG. 1B. That is, the third digit of each ICCID 130-132 can be adjusted to the second digit of the CC of the ICCIDs 120-122 shown in FIG. 1B. Further, the fourth digit of each ICCID can be adjusted to the third digit of the associated IMSI 134-136. Thus, as shown in chart, the adjusted first ICCID 130 and the adjusted second ICCID 132 do not match, are the same, or conflict. Further, the each adjusted first ICCID 130 and the adjusted second ICCID 132 is different than the first ICCID 120 shown in FIG. 1B. Therefore, a first communication device configured with either the first ICCID or the first adjusted ICCID would not cause a registration error, routing error, or some other network error when in the same mobile network as a communication device configured with the second adjusted ICCID. Note, the scheme for adjusting the ICCID 130-132 can also be used to generate an ICCID from an associated with IMSI.

Figure 2:
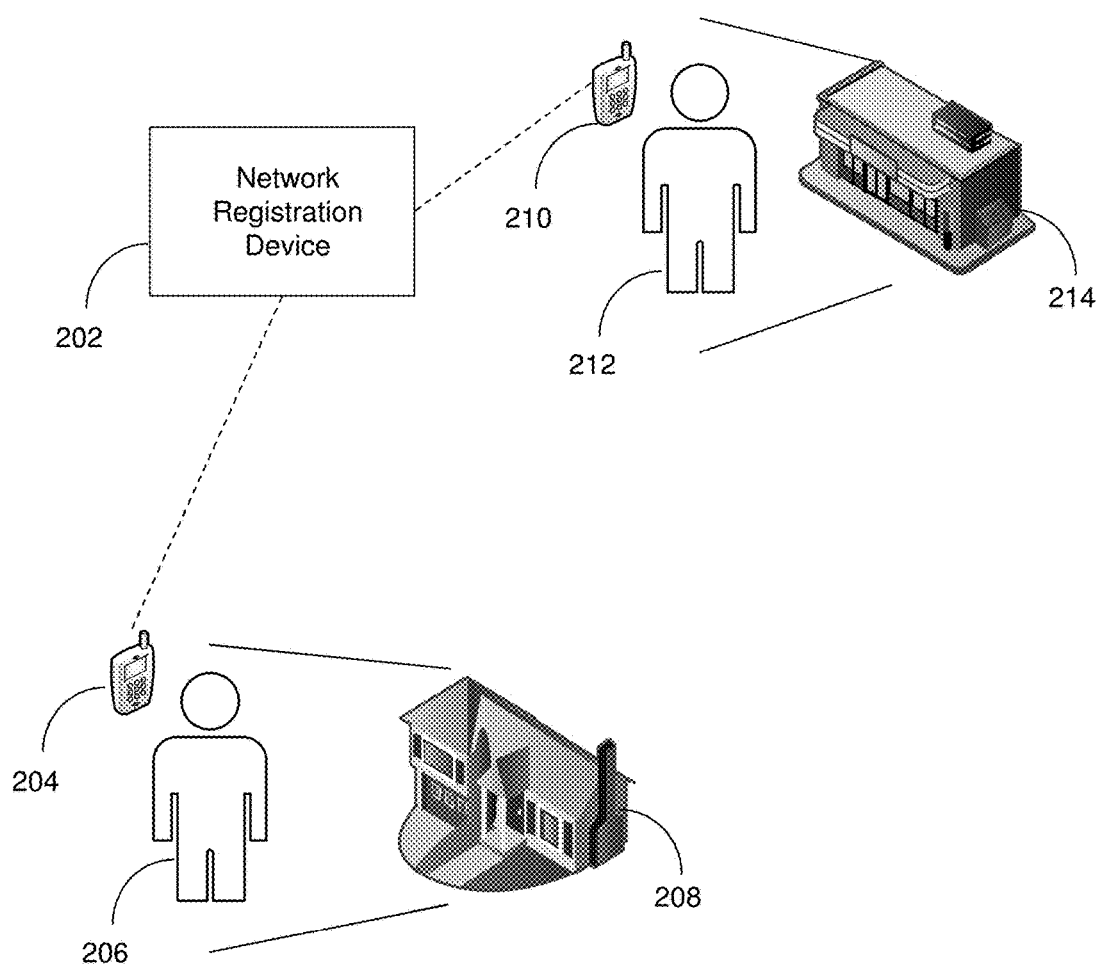

Referring to FIG. 2, in one or more embodiments, a system 200 can include a network registration device 202 that registers communication devices 204, 210 into a mobile network. A user 206 at a residence 208 is associated with communication device 204. Further, a user 212 may have newly purchased communication device 210 at a mobile phone distributor 214.

In one or more embodiments, communication device 204 can be associated with IMSI 124 while communication device 210 can be associated with IMSI 126. Thus, communication device 204 can be provisioned with ICCID 120 and communication device 210 can be provisioned with ICCID 122, which matches, is the same as, or conflicts with ICCID 120. Upon activating communication device 210 and registering with network registration device 202 for a mobile network, the network registration device can detect that ICCID 122 of communication device 210 matches, is the same as, or conflicts with ICCID 120 of communication device 204. In other embodiments, the network registration device detects a registration error, routing error, or some other network error for communication device 210 and determines that ICCID 120 matches, is the same as, or conflicts with ICCID 122.

In one or more embodiments, the network registration device 202 can adjust the ICCID 122 of communication device 210 to an adjusted ICCID 132 and update all network devices in the mobile network accordingly such that communication device 210 can operate without any network error. In some embodiments, the network registration device (or some other network device) 202 can generate and issue a new ICCID that is the identical to ICCID 132. In other embodiments, the network registration device 202 (or some other network device) can adjust the ICCID 120 of communication device 204 to an adjusted ICCID 130 to prevent any match or conflict to an ICCID associated with another communication device in the future. In further embodiments, the network registration device 202 can generate and issue a new ICCID that is the identical to ICCID 130.

Figure 3:
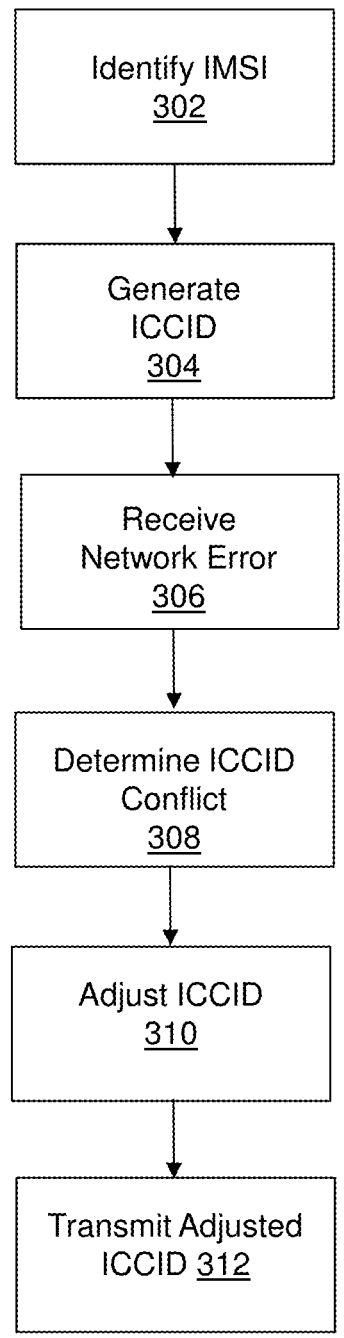
FIG. 3 depicts an illustrative embodiment of a method used in portions of the systems described in FIGS. 1A-1C and FIG. 2.

FIG. 3 depicts an illustrative embodiment of a method 300 used in portions of the systems described in FIGS. 1A-1C and FIG. 2. In some embodiments, the method 300 can be implemented by a computing device such as a SIM manager or an ICCID/IMSI manager. In other embodiments, the method 300 can be implemented by a computing device such as a network device (e.g. network registration device) operating in a mobile network. The method 300 can include, at 302, the computing device identifying an IMSI for a first mobile device. The IMSI comprises fifteen digits such that a first three digits of the IMSI comprises a mobile country code (MCC), and a second three digits of the IMSI comprises a mobile network code (MNC). Further, the method 300 can include, at 304, the computing device generating a first ICCID. The ICCID comprises twenty digits such that a first two digits of the ICCID comprises a MII, a second two digits comprises a CC, and a first three digits of the ICCID after the CC comprises the MNC. In addition, the method 300 can include, at 306, the computing device receiving a network error indicating that the first ICCID is same as a second ICCID for a second mobile device. Also, the method 300 can include, at 308, the computing device determining a match between the first ICCID and a second ICCID for a second mobile device.

Further, the method 300 can include, at 310, the computing device adjusting the first ICCID resulting in a first adjusted ICCID responsive to determining the match. In some embodiments, the adjusting of the first ICCID comprises adjusting a number of digits for the CC of the first ICCID. In other embodiments, the adjusting of the first ICCID comprises adjusting the CC from two digits to one digit. In further embodiments, the adjusting of the first ICCID comprises adjusting a fourth digit of the first ICCID. In additional embodiments, the adjusting of the first ICCID comprises adjusting a fourth digit of the first ICCID to a first digit of the MCC of the IMSI.

In addition, the method 300 can include, at 312, transmitting the adjusted first ICCID, wherein the adjusted first ICCID is associated with the IMSI for the first mobile device. In some embodiments, the transmitting of the adjusted first ICCID comprises transmitting the adjusted first ICCID to a computing device operated by a SIM provider. In other embodiments, the transmitting of the adjusted first ICCID comprises transmitting the adjusted first ICCID to a computing device operated by a network management entity. Transmitting the adjusted first ICCID facilitates a SIM manufacturer to provision a SIM with the first ICCID to a first mobile device to provide communication services.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Embodiments described herein or portions thereof can be combined with other embodiments described herein or portions thereof.

Figure 4:
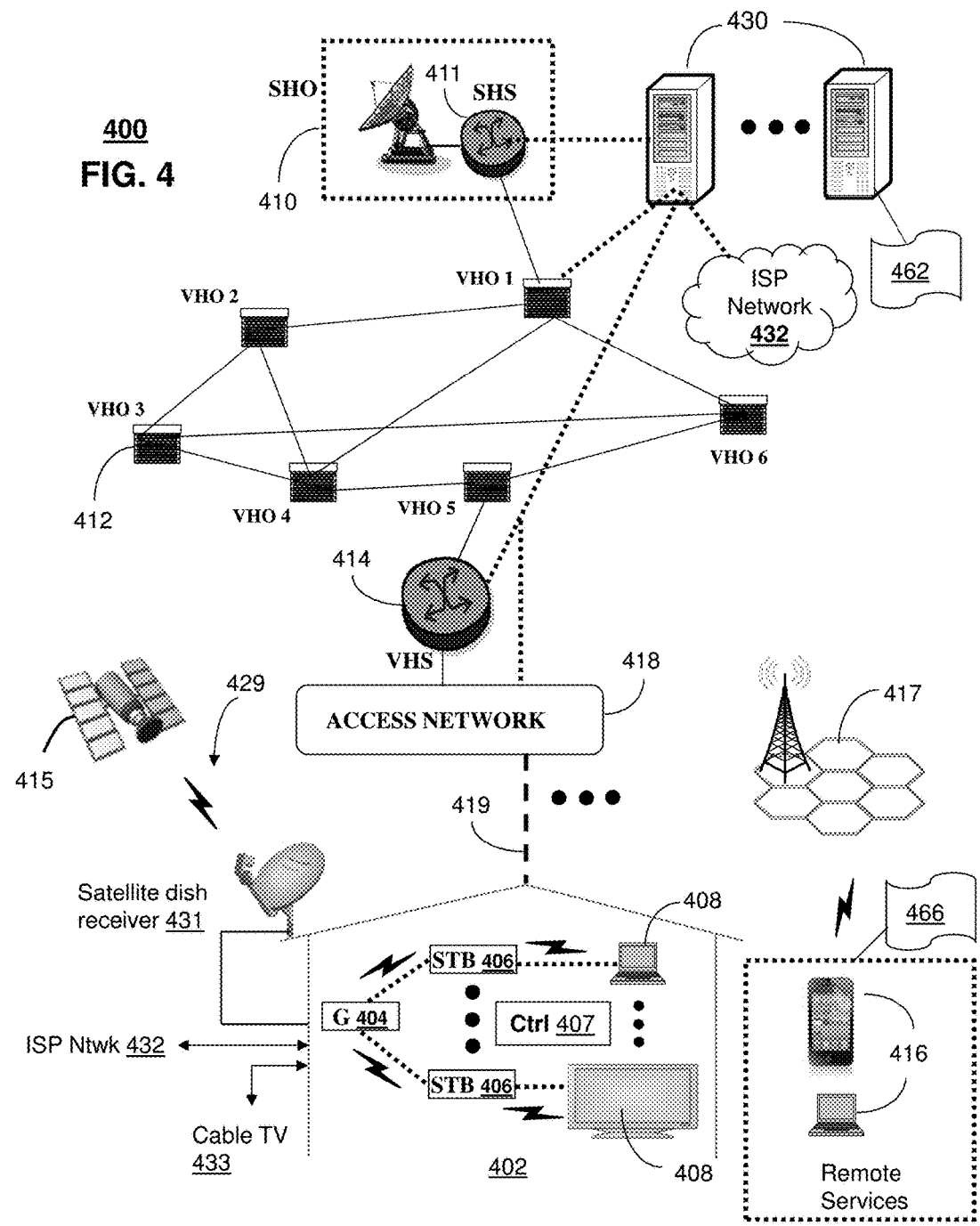
FIGS. 4-5 depict illustrative embodiments of communication systems that provide a resolution of conflicts between identifiers for communication devices.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with systems 100, 200 of FIGS. 1A and/or 2 as another representative embodiment of communication system 400. For instance, one or more devices illustrated in the communication system 400 of FIG. 4 can identify an IMSI for a first mobile device. The IMSI comprises fifteen digits such that a first three digits of the IMSI comprises a MCC, and a second three digits of the IMSI comprises a MNC. Further, the one or more devices can generate a first ICCID. The ICCID comprises twenty digits such that a first two digits of the ICCID comprises a MII, a second two digits comprises a CC, and a first three digits of the ICCID after the CC comprises the MNC. In addition, the one or more devices can determine a match between the first ICCID and a second ICCID for a second mobile device. Also, the one or more devices can adjust the first ICCID resulting in a first adjusted ICCID responsive to determining the match. Further, the one or more devices can transmit the adjusted first ICCID. The adjusted first ICCID is associated with the IMSI for the first mobile device.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an ICCID manager (herein referred to as ICCID manager 430). The ICCID manager 430 can use computing and communication technology to perform function 462, which can include among other things, the ICCID management techniques described by method 300 of FIG. 3. For instance, function 462 of server 430 can be similar to the functions described for servers 108 of FIG. 1A and network registration device 202 of FIG. 2 in accordance with method 300. The wireless communication devices 416 can be provisioned with software functions and 466, respectively, to utilize the services of ICCID manager 430. For instance, functions 466 of wireless communication devices 416 can be similar to the functions described for the communication devices 104, 204, 210 of FIGS. 1A and 2 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
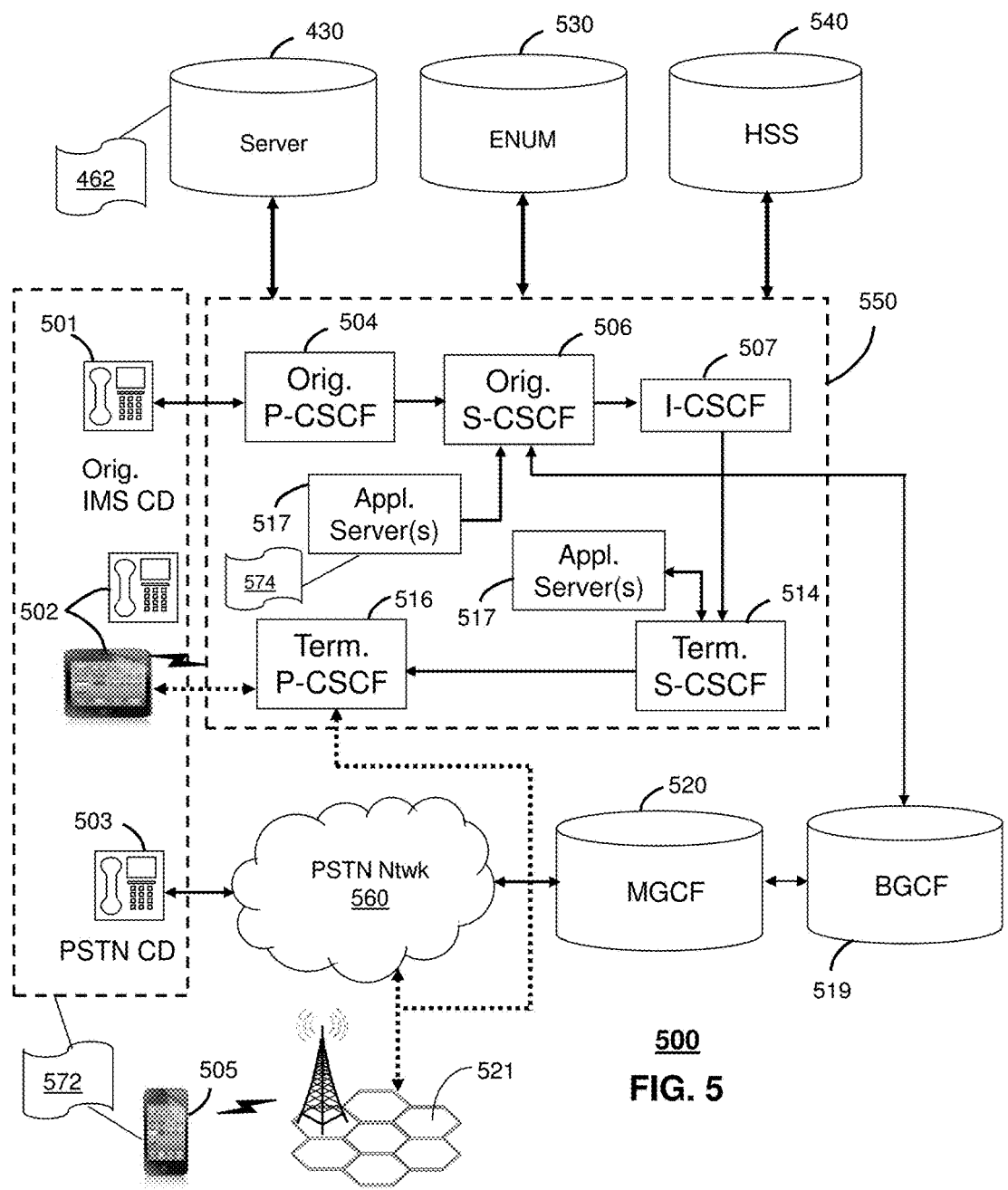

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 and 200 of FIGS. 1A and/or 2 and communication system 400 as another representative embodiment of communication system 400.

Embodiments can include identifying an IMSI for a first mobile device. The IMSI comprises fifteen digits such that a first three digits of the IMSI comprises a mobile country code (MCC), and a second three digits of the IMSI comprises a mobile network code (MNC). Further embodiments can include generating a first ICCID). The first ICCID comprises twenty digits such that a first two digits of the ICCID comprises a major industry identifier (MII), a second two digits comprises a country code (CC), and a first three digits after the CC of the first ICCID comprises the MNC. Additional embodiments can include receiving a network error indicating that the first ICCID is same as a second ICCID for a second mobile device. Also, embodiments can include adjusting the first ICCID resulting in a first adjusted ICCID. The adjusting of the first ICCID comprises adjusting a number of digits for the CC of the first ICCID. Further embodiments can include transmitting the adjusted first ICCID. The adjusted first ICCID is associated with the IMSI for the first mobile device.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The ICCID manager 430 of FIG. 4 can be operably coupled to communication system 500 for purposes similar to those described above. ICCID manager 430 can perform function 463 and thereby provide ICCID management services to the CDs 501, 502, 503 and 505 of FIG. 5 similar to the functions described for server 108 of FIG. 1A and network registration device 202 in accordance with method 300 of FIG. 3. CDs 501, 502, 503 and 505, which can be adapted with software to perform function 572 to utilize the services of the ICCID manager 430 similar to the functions described for communication devices 104, 204, and 210 of FIG. 1A and FIG. 22 in accordance with method 300 of FIG. 3. ICCID manager 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
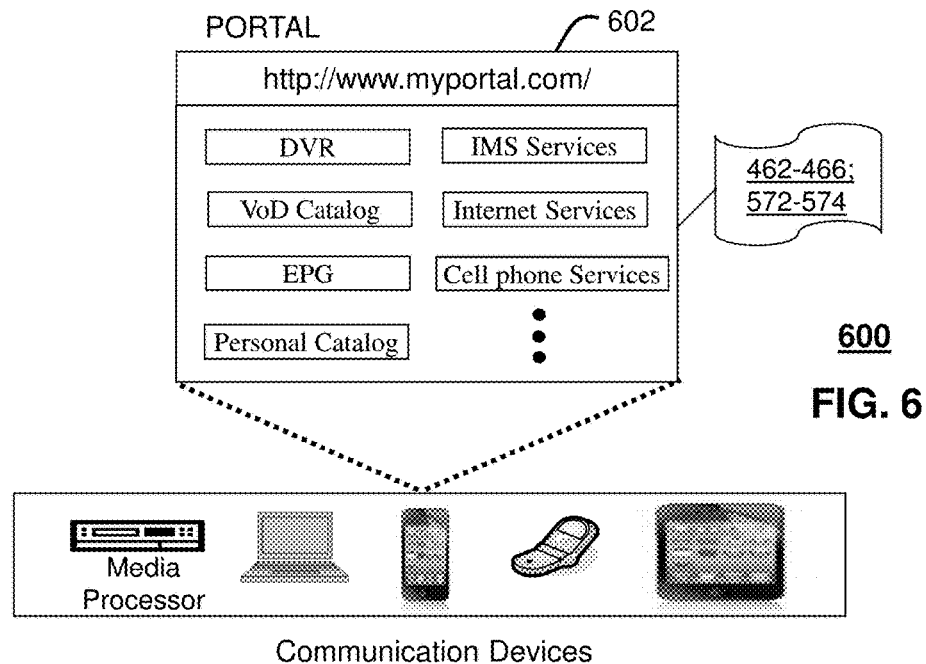
FIG. 6 depicts an illustrative embodiment of a web portal for interacting with the communication systems of FIGS. 1A-C and FIG. 2, and FIGS. 4-5.

FIG. 6 depicts an illustrative embodiment of a web portal 602 of a communication system 600. Communication system 600 can be overlaid or operably coupled with systems 100, 200 of FIGS. 1A and/or 2, communication system 400, and/or communication system 500 as another representative embodiment of systems 100, 200 of FIGS. 1A and/or 2, communication system 400, and/or communication system 500. The web portal 602 can be used for managing services of systems 100, 200 of FIGS. 1A and/or 2 and communication systems 400-500. A web page of the web portal 602 can be accessed by a Uniform Resource Locator (URL) with an Internet browser using an Internet-capable communication device such as those described in FIGS. 1A and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200 of FIGS. 1A and/or 2, and communication systems 400-500. For instance, users, such as mobile network operator personnel, of the services provided by server 108, network registration device 202 or ICCID manager 430 can log into their on-line accounts and provision the server 108, network registration device 202, or ICCID manager 430 with adjusted ICCID for a communication device to resolve ICCID conflicts with other communication device(s), and so on. Service providers can log onto an administrator account to provision, monitor and/or maintain the systems 100, 200 of FIGS. 1A and/or 2 or server 430.

Figure 7:
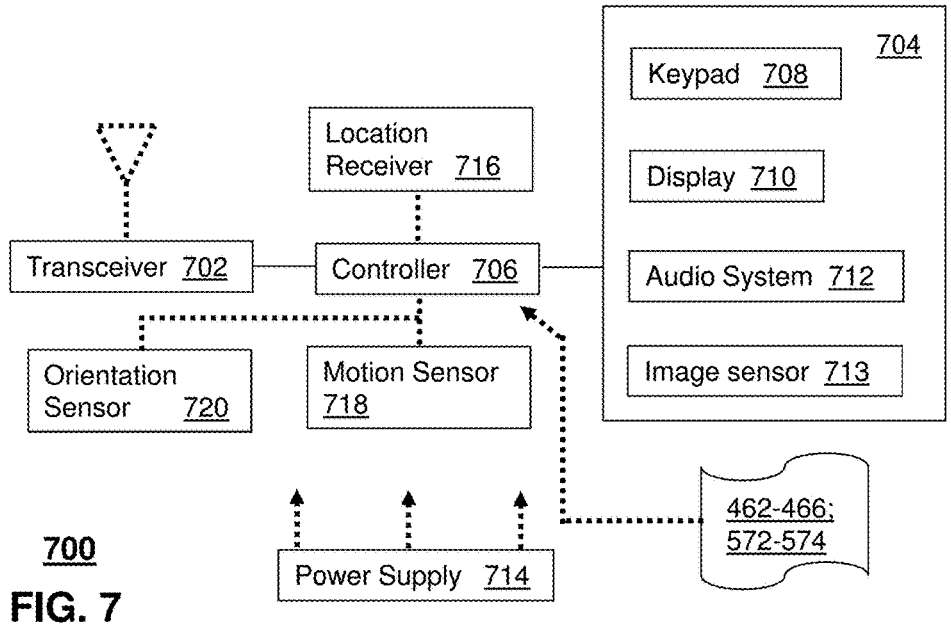
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1A-1C and/or FIG. 2, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of communication devices 104, 204, and 210 of FIGS. 1A and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 of FIGS. 1A and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
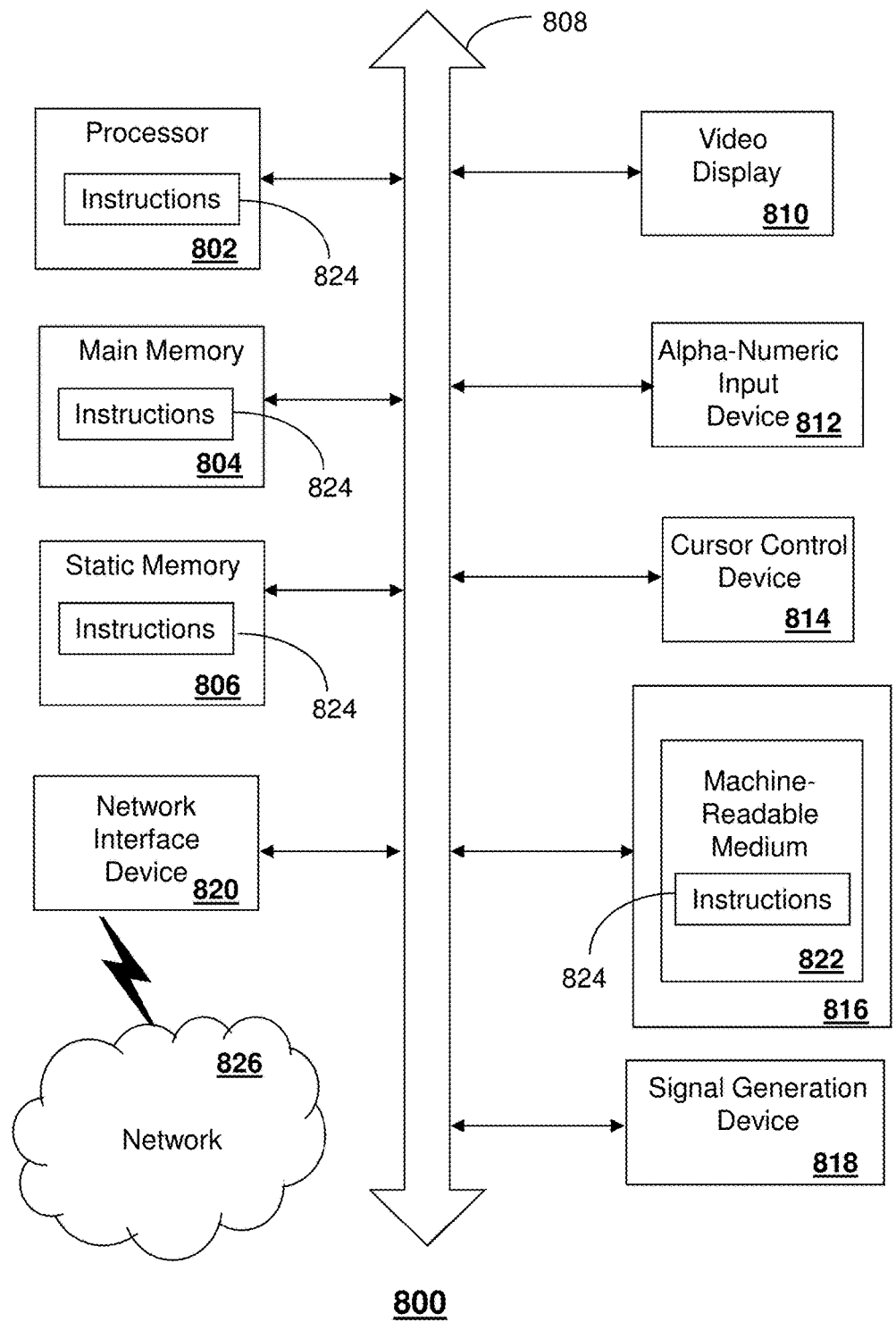
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the ICCID manager 430, the media processor 406, servers 108, 116, communication devices 104, 204, 210, network registration device 202 and other devices of FIGS. 1A-2. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
identifying an international mobile subscriber identity (IMSI) for a first mobile device, wherein the IMSI comprises fifteen digits, wherein a first three digits of the IMSI comprises a mobile country code (MCC), wherein a second three digits of the IMSI comprises a mobile network code (MNC);
generating a first integrated circuit card identifier (ICCID), wherein the ICCID comprises twenty digits, wherein a first two digits of the ICCID comprises a major industry identifier (MII), wherein a second two digits comprises a country code (CC), and wherein a first three digits of the ICCID after the CC comprises the MNC;
determining a match between a first plurality of digits of the first ICCID and a second plurality of digits of a second ICCID for a second mobile device;
adjusting at least one of the first plurality of digits of the first ICCID to a third plurality of digits resulting in a first adjusted ICCID responsive to determining the match, wherein the first adjusted ICCID comprises the third plurality of digits, wherein the first plurality of digits is different from the third plurality of digits; and
transmitting the adjusted first ICCID, wherein the adjusted first ICCID is associated with the IMSI for the first mobile device.

2. The device of claim 1, wherein the adjusting of the first ICCID comprises adjusting a number of digits for the CC of the first ICCID.

3. The device of claim 1, wherein the adjusting of the first ICCID comprises adjusting the CC from two digits to one digit.

4. The device of claim 1, wherein the adjusting of the first ICCID comprises adjusting a fourth digit of the first ICCID.

5. The device of claim 1, wherein the adjusting of the first ICCID comprises adjusting a fourth digit of the first ICCID to a first digit of the MCC of the IMSI.

6. The device of claim 1, wherein the transmitting of the adjusted first ICCID comprises transmitting the adjusted first ICCID to a computing device operated by a subscriber identity module (SIM) provider.

7. The device of claim 1, wherein the transmitting of the adjusted first ICCID comprises transmitting the adjusted first ICCID to a computing device operated by a network management entity.

8. A machine-readable storage medium, comprising executable instructions that, when executed by a processing system including a processor, facilitate performance of operations, the operations comprising:
identifying an international mobile subscriber identity (IMSI) for a first mobile device, wherein the IMSI comprises fifteen digits, wherein a first three digits of the IMSI comprises a mobile country code (MCC), wherein a second three digits of the IMSI comprises a mobile network code (MNC);
generating a first integrated circuit card identifier (ICCID), wherein the ICCID comprises twenty digits, wherein a first two digits of the first ICCID comprises a major industry identifier (MII), wherein a second two digits comprises a country code (CC), and wherein a first three digits after the CC of the first ICCID comprises the MNC;
receiving a network error indicating that the first ICCID is same as a second ICCID for a second mobile device;
adjusting the at least one of a first plurality of digits of the first ICCID to a second plurality of digits resulting in a first adjusted ICCID, wherein the first adjusted ICCID comprises the second plurality of digits, wherein the adjusting of the first ICCID comprises adjusting a number of digits for the CC of the first ICCID, wherein the first plurality of digits is different from the second plurality of digits; and
transmitting the adjusted first ICCID, wherein the adjusted first ICCID is associated with the IMSI for the first mobile device, wherein transmitting the adjusted first ICCID facilitates a SIM manufacturer to provision a SIM with the first ICCID to the first mobile device to provide communication services.

9. The machine-readable storage medium of claim 8, wherein the adjusting of the first ICCID comprises adjusting the CC from two digits to one digit.

10. The machine-readable storage medium of claim 8, wherein the adjusting of the first ICCID comprises adjusting a fourth digit of the first ICCID.

11. The machine-readable storage medium of claim 8, wherein the adjusting of the first ICCID comprises adjusting a fourth digit of the first ICCID to a first digit of the MCC of the IMSI.

12. The machine-readable storage medium of claim 8, wherein the transmitting of the adjusted first ICCID comprises transmitting the adjusted first ICCID to a computing device operated by a subscriber identity module (SIM) provider.

13. The machine-readable storage medium of claim 8, wherein the transmitting of the adjusted first ICCID comprises transmitting the adjusted first ICCID to a computing device operated by a network management entity.

14. A method, comprising:
identifying, by a processing system including a processor, an international mobile subscriber identity (IMSI) for a first mobile device, wherein the IMSI comprises fifteen digits, wherein a first three digits of the IMSI comprises a mobile country code (MCC), wherein a second three digits of the IMSI comprises a mobile network code (MNC);
generating, by the processing system, a first integrated circuit card identifier (ICCID), wherein the ICCID comprises twenty digits, wherein a first two digits of the ICCID comprises a major industry identifier (MII), wherein a second two digits comprises a country code (CC), and wherein a first three digits after the CC of the first ICCID comprises the MNC;
determining, by the processing system, a match between a first plurality of digits of the first ICCID and a second plurality of digits of a second ICCID for a second mobile device; and adjusting, by the processing system, at least one of the first plurality of digits of the first ICCID to a third plurality of digits resulting in a first adjusted ICCID responsive to determining the match, wherein the first adjusted ICCID comprises the third plurality of digits, wherein the adjusting of the first ICCID comprising adjusting a fourth digit of the first ICCID, wherein the first plurality of digits is different from the third plurality of digits.

15. The method of claim 14, comprising transmitting, by the processing system, the adjusted first ICCID, wherein the adjusted first ICCID is associated with the IMSI for the first mobile device.

16. The method of claim 15, wherein the transmitting of the adjusted first ICCID comprises transmitting, by the processing system, the adjusted first ICCID to a computing device operated by a subscriber identity module (SIM) provider.

17. The method of claim 15, wherein the transmitting of the adjusted first ICCID comprises transmitting the adjusted first ICCID to a computing device operated by a network management entity.

18. The method of claim 14, wherein the adjusting of the first ICCID comprises adjusting a number of digits for the CC of the first ICCID.

19. The method of claim 14, wherein the adjusting of the first ICCID comprises adjusting the CC from two digits to one digit.

20. The method of claim 14, wherein the adjusting of the first ICCID comprises adjusting a fourth digit of the first ICCID to a first digit of the MCC of the IMSI.

* * * * *